F. H. BALL.
CONNECTION FOR ELECTRIC CONDUCTORS.
APPLICATION FILED AUG. 6, 1906.
899,708.
Patented Sept. 29, 1908.
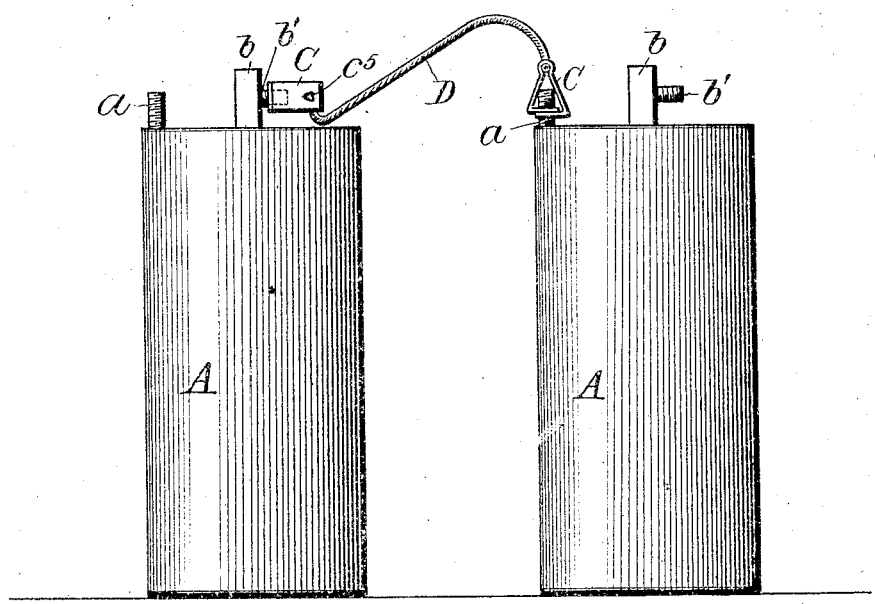
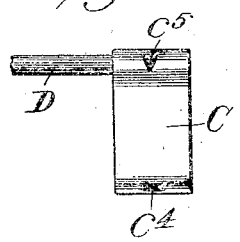 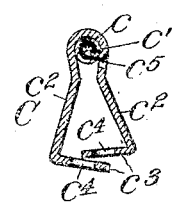 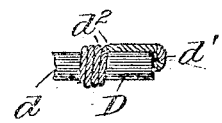
Inventor
Frank H Ball

UNITED STATES PATENT OFFICE.

FRANK H. BALL, OF NORTH PLAINFIELD, NEW JERSEY.

CONNECTION FOR ELECTRIC CONDUCTORS.

No. 899,708.

Specification of Letters Patent.

Patented Sept. 29, 1908.

Application filed August 6, 1906. Serial No. 329,357.

*To all whom it may concern:*

Be it known that I, FRANK H. BALL, a citizen of the United States, residing at North Plainfield, in the county of Somerset and State of New Jersey, have invented new and useful Improvements in Connections for Electric Conductors, of which the following is a specification.

This invention relates to connections for electric conductors and consists in certain improvements in the construction thereof as will be hereinafter fully described and pointed out in the claims.

In some respects the invention is an improvement over the device shown by Frederick O. Ball, in the application filed January 31, 1906, No. 298,736. In the construction therein shown, a clamp is formed by a spring loop. An electric conductor is passed through one side of the loop and is secured to the other side usually by soldering. The wire passing through the side of the spring loop makes it inconvenient to compress the spring in placing it on a conductor and the manner of securing the flexible conductor to the clamp is more expensive than that shown in the present application.

The invention is illustrated in the accompanying drawings as follows:

Figure 1 shows two batteries connected with my connection. Fig. 2, a side elevation of the clamp forming part of the connection. Fig. 3 is a cross section of the same. Fig. 4, a plan view of an end of the flexible conductor. Fig. 5, an end view of the same.

The connection is shown as applied to batteries and it is peculiarly adapted for this purpose, but may be used wherever it is desirable to connect two conductors. The batteries A—A are of the usual form. $a$—$a$ and $b$—$b$ are the electrodes. The electrodes $a$ are screw threaded and the electrodes $b$ have the screw threaded studs $b'$.

The clamp C is preferably in the form of a spring clamp; it comprising the turn $c$, the sides $c^2$ and the inwardly extending contact plates $c^3$. The contact plates, preferably overlapped, are provided with perforations $c^4$. The perforations are so arranged that when the spring loop is compressed they are brought into register and while in register, a clamp may be placed over an electrode. When released the spring acting on the plates forces them into engagement with the threads of the electrodes. The loop has the contracted portion $c'$ and the flexible conductor D is placed in this contracted portion. The flexible conductor has the ordinary insulation $d$ so that it is desirable to remove the insulation from the end $d'$ and wrap the wires back over the insulation as at $d^2$ so that they may be brought into intimate contact with the walls of the loop. The end of the conductor D, thus arranged, is forced into contracted portion $c'$. This ordinarily holds it in place, but as an additional means of security, I force the point $c^5$ inwardly into the material forming the conductor, thus making a positive engagement. The point $c^5$ is arranged in the material forming the spring loop.

It will be observed that when the loop is compressed to bring the perforations into register, that the walls of the loop are forced inwardly, thus exerting a maximum pressure upon the flexible conductor when the clamp is in place on the electrode. This makes the engagement between the flexible conductor and the clamp stronger and also makes the electrical contact more certain while the connection is in use.

What I claim as new is:

1. A connection for electric conductors comprising an electric conductor; a spring clamp having jaws actuated by the clamp to detachably engage the conductor with a spring pressed contact; and a second conductor clamped and permanently held by the jaws of the clamp in position to receive greater pressure from the jaws as the clamp is placed in engagement with the first conductor.

2. A connection for electric conductors comprising a spring loop; devices at the ends of the loop for detachably engaging an electric conductor with spring pressure exerted by the loop; and a second electric conductor arranged in the loop and clamped by the walls thereof.

3. A connection for electric conductors comprising a spring loop; devices at the ends of the loop for detachably engaging an electric conductor; and a second electric conductor arranged in the loop and clamped by the walls thereof, the walls of the loop closing on the conductor therein as the clamp is brought to position to engage the conductor at the ends of the loop.

4. A connection for electric conductors comprising a spring loop formed of the turn $c$ and sides $c^2$ having contact plates $c^3$ arranged transversely of the sides of the loop and having contact surfaces along the edges thereof that are forced into engagement by the action of the loop; and an electric conductor arranged within the loop and clamped by the walls thereof.

5. A connection for electric conductors comprising a spring clamp in the form of a loop and having overlapping plates extending inwardly from the loop, said plates being provided with perforations adapted to be brought into register by the compression of the loop; and a conductor arranged within the walls of the loop and clamped by the walls thereof.

6. A connection for electric conductors comprising a spring clamp in the form of a loop and having overlapping plates extending inwardly from the loops, said plates being provided with perforations adapted to be brought into register by the compression of the loop; and a conductor arranged within the loop and clamped by the walls thereof, the walls closing on the conductor as the clamp is sprung to position to bring the perforations into register.

7. A connection for electric conductors comprising the flexible conductor D; a clamp in the form of a spring loop secured to each end of the flexible connection by the clamping action of the walls of the loop, the engaging pressure on the flexible connection being increased as the clamps are compressed, said clamps having jaws adapted to engage an electric conductor when compressed.

8. A connection for electric conductors comprising the flexible conductor D and the clamp C, the clamp C being in the form of a spring loop having the turn $c$, contracted portion $c'$, sides $c^2$ extending from the portion $c'$, and overlapping plates $c^3$ extending from the sides having the perforations $c^4$, the conductor D being arranged in the contracted portion $c'$ and clamped by the walls thereof.

In testimony whereof I have hereunto set my hand in the presence of two subscribing witnesses.

FRANK H. BALL.

Witnesses:
ROBT. T. BRAMPTON,
A. K. SMITH.